United States Patent [19]

Sollinger

[11] Patent Number: 4,811,011
[45] Date of Patent: Mar. 7, 1989

[54] AUTOMATIC METERING APPARATUS

[76] Inventor: Johann Sollinger, R.R. #3, King City, Ontario, Canada, L0G 1K0

[21] Appl. No.: 44,014

[22] Filed: Apr. 29, 1987

[30] Foreign Application Priority Data

Apr. 30, 1986 [CA] Canada ................................. 508020

[51] Int. Cl.$^4$ ...................... G08B 23/00; G08C 15/06
[52] U.S. Cl. ............................... 340/870.02; 379/107
[58] Field of Search ...................... 340/870.02, 870.03, 340/870.28; 250/231; 324/157; 379/107

[56] References Cited

U.S. PATENT DOCUMENTS

| Re. 26,331 | 2/1961 | Brothman et al. | 340/870.02 |
|---|---|---|---|
| 2,578,939 | 12/1951 | Moran, Jr. | |
| 3,083,357 | 3/1963 | Chapin et al. | |
| 3,656,112 | 4/1972 | Paull | 340/870.02 |
| 3,742,142 | 6/1973 | Martin | |
| 4,489,384 | 12/1984 | Horley et al. | 340/870.02 |
| 4,680,704 | 7/1987 | Konicek et al. | 340/870.02 |
| 4,682,169 | 7/1987 | Swanson | 340/870.02 |

FOREIGN PATENT DOCUMENTS 1217668  9/1964  Fed. Rep. of Germany .

OTHER PUBLICATIONS

N.E.C. Research and Development, No. 65, Apr. 1982, pp. 82-92, Tokyo, JP: K. Shirai et al.: "Remote Automatic Meter Reading and Telecontrol System Using Telephone Lines".

Japan Telecommunications Review, vol. 25, No. 4, Oct. 1983, pp. 2288-2292, Tokyo, JP; K. Ono et al., "Remote Meter Reading System Utilizing the No-Ringing Circuit Service on Existing Telephone Lines".

Primary Examiner—John W. Caldwell, Sr.
Assistant Examiner—Tyrone Queen
Attorney, Agent, or Firm—Larson and Taylor

[57] ABSTRACT

An automatic utility meter reading and monitoring system comprises at each customer premises at least one sensor for automatically reading the amount of usage of a utility service, processing means for accepting data for said at least one sensor, and a communications interface connected to said microcomputer, and at a central office a main computer for accepting data relating to the amount of usage of the utility service at each customer premises over a remote link connected to said communications interface, said main computer being arranged to poll said microcomputers periodically at said customer premises on a basis to obtain therefrom billing and local management information. The continuous polling of said customer premises not only allows for easy conversion to time-of-day metering, but also provides information relating to load distribution on an ongoing basis.

12 Claims, 1 Drawing Sheet

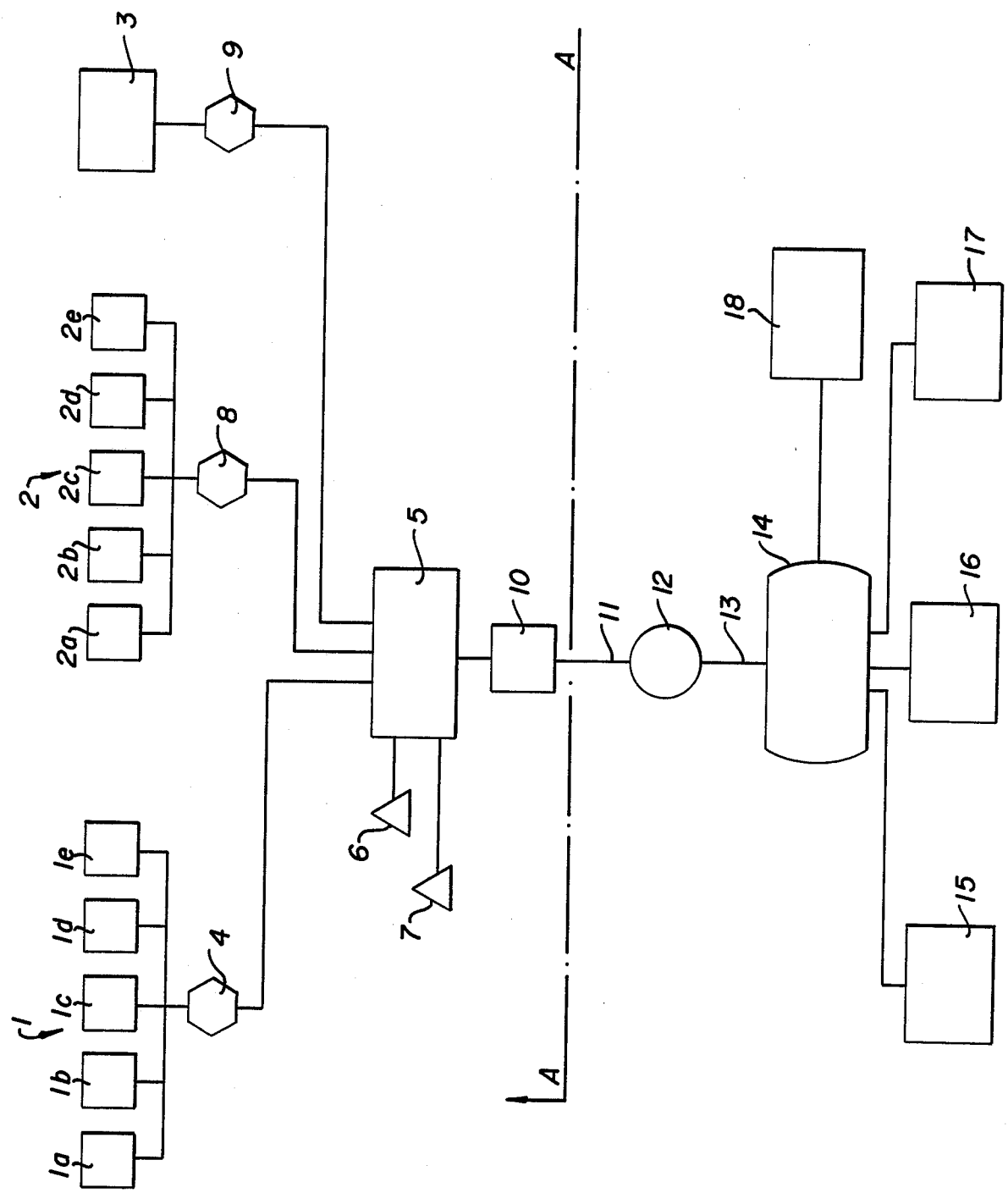

AUTOMATIC METERING APPARATUS

This invention relates to an automatic utility meter reading and monitoring system for the remote reading of utility service usage at customer premises.

In most places utility meter reading is still carried out by having a meter reader periodically visit customer premises. This is an expensive and time consuming method of reading meters, particularly as the customer is often not at home at the time of the visit. A very large number of utility meters are in use today, most of which are mechanical. Attempts to upgrade metering systems using more modern equipment have been frustrated by the very high cost of replacing existing meter equipment now in place.

Another problem for utilities is load management. Particularly in the case of electricity, which cannot be conveniently stored in any quantity, a utility has to have information relating to the load distribution at any one time. This information is currently provided by sensors at main distribution points, but detailed information at the customer level is not available.

In order to smooth out variations in service demand, it can be desirable for the utility to charge different rates at different times. Such differential rate structures can encourage customers to use the service at times when general consumption is low. Differential charging systems have been proposed, but these require modifications or additions to existing metering equipment.

The object of the invention is to alleviate the aforementioned disadvantages.

According to the present invention there is provided an automatic utility meter reading and monitoring system, comprising at each customer premises at least one sensor for automatically reading the amount of usage of a utility service, processing means for accepting data from said at least one sensor, and a communications interface connected to said microcomputer, and at a central office a main computer for accepting data relating to the amount of usage of the utility service at each customer premises over a remote link connected to said communications interface, said main computer being arranged to poll said microcomputers periodically at said customer premises on a basis to obtain therefrom billing and load management information.

The sensor preferably comprises an optical reader for reading an existing utility meter. This may be be an optical scanner with a character recognition system, or in the case of an electricity meter can be an optical imaging system arranged to determine the meter reading from the location of the pointers on the dials. The main computer at the central office is preferably connected directly to utility and bank computer centres to permit automatic direct billing to customers accounts. Each customer can be given a unique identification code, which assists in the detection of customers attempting to avoid payment by moving premises. If a delinquent customer attempts to obtain service at a new location, the computer will automatically match his identification code with a code stored in the computer and raise the alarm.

In a fully integrated system electricity, gas, and water readings are read automatically at each customer premises, and the three readings transmitted over the remote data link to the main computer at the central office. This in turn can distribute the billing and load management information to the utility company and bank computers for automatic billing and load management purposes.

The invention will now be described in more detail, by way of example only, with reference to the accompanying drawings, in which the single FIGURE is a schematic block diagram of a utility meter reading and monitoring system in accordance with the invention.

At each customer premises, indicated generally by the equipment shown on the upper side of the broken line A—A, there are installed an electricity meter 1, gas meter 2, and a water meter 3 for measuring the consumption of the various services. These are conventional mechanical meters, which are currently read by a meter reader visiting the customer premises. The electricity meter has 5 dials, 1a, 1b, 1c, 1d, 1e and similarly the gas meter has 5 dials, 2a, 2b, 2c, 2d, 2e. The water meter 3 has a mechanical digital readout. A scanning device 4 is installed on the electricity meter 1. The scanning device comprises a CCD camera or similar imaging device which scans an image of the meter dials. The device 4 can be conveniently mounted within the transparent cover of a conventional meter. The data formed by the image scanner 4 is transferred to a microcomputer 5 at the customer premises where data pertaining to the background image are removed, leaving only data pertaining to the location of the pointers on the dials. From this image data, the microcomputer 5 can determine the current reading of the electricity meter. The microcomputer includes a timer 6 and a power supply with backup battery 7.

An advantage of employing an image scanner with a pattern recognition program in the microcomputer 5 is that minimal modification is required to the conventional meter 1. The scanner 4 merely has to be mounted on the meter so that the dials are in its field of view, the preferred mounting arrangement being on the inside face of the transparent cover.

A similar arrangement is employed for the gas meter 2. Image scanner 8, preferably in the form of a CCD camera, scans an image of the gas meter dials. This image is fed to the microcomputer 5, where data pertaining to the static background are removed. From the location of the pointers, the reading on the electricity meter can be determined by the microcomputer 5 in a similar manner to the reading on the electricity meter 1.

The water meter 3 has a simple electro-mechanical digital display. An image scanner 9 forms an image of the display and transfers this to the microcomputer 5, where a character recognition program converts the data image into numerical data.

The microcomputer 5 constantly monitors the readings of the three meters 1, 2, 3, either sequentially or in parallel. The resulting image information is converted to numerical data and stored in the microcomputer memory.

Instead of image scanners, other forms of sensor can be employed. For example, a matrix, such as a 10×10 matrix, can be placed over each dial and the data formed by the matrix used to determine the location of the pointers or, in the case of the water meter 3, the numerical characters displayed. In an alternative embodiment, the rotation of the meters can be sensed and the amount of usage deduced from the rotation of the meters. The latter arrangement is less satisfactory in that a small modification of the meters is required in order to mount a sensor in the meter capable of detecting meter rotation. For example, one way of doing this is to mount a photo sensor in the meter responsive to the passage of a special mark placed on the eddy disk (in the case of an electricity meter).

In the embodiment shown, the data from the microcomputer 5 are converted to analogue form in the communications interface 10 and transmitted over a telephone line 11 to a telephone exchange 12, from where they are transmitted over a data line 13 to a main system computer 14 at a central office. From the main computer 14 data are transmitted to existing utility computers 15, 16, 17, which in turn can be connected directly over remote links to bank computers to permit direct automated billing of customer accounts.

The microcomputer 5 at each customer premises has a unique address. At the request of the main computer 14, the microcomputer 5 transmits a frame over the telephone line 11 containing a customer identification code, a security code, and data pertaining to the most updated readings of all three meters 1, 2, 3. The frame is transmitted as a simple bit string, which is then converted in the main computer 14 to ASCII or B.C.D. and stored on individual customer records. The data pertaining to the respective services, electricity, water, gas are transmitted at periodic intervals (monthly) to utility company computers 15, 16, 17. These computers can be coupled directly to bank computers so as to permit fully automated billing for customers who desire it.

As the main computer 14 can poll the individual microcomputers at will, the polling can take place at frequent intervals for example the main computer can scan through all the customer accounts once every few minutes. The advantage of such a system is that this information can be used for load management purposes and also time-of-day metering. By scanning through the customer accounts, the main computer 14 can be programmed to determine where the peak loads occur on a detailed basis. By comparing the sum of the meter readings with the total service provided, as measured by bulk measuring devices at various distribution points, the utility companies are able to determine the amount of losses due to theft or faults in the distribution system. In the case of water, for example, the precise amount of leakage in the distribution pipes can be determined.

In the described embodiments, the main computer 14 communicates with the microcomputer 5 over a data line 13 to the telephone exchange 12, and from there over a telephone line 11 to the customer premises. The data on the telephone line 11 can be multiplexed onto the line without interferring with normal voice communications. In an alternative arrangement, the data are transmitted over power lines using power line carrier technology. In this technology, a data signal modulated onto a carrier is superimposed onto the power supply line feeding the customer premises. While the carrier will not pass through large scale transformer stations, it will pass through small transformers and can be extracted at substations for onward transmission by data line to the main computer 14.

To the frame transmitted by the microcomputer 5 can be added to the exact time of the last reading of the last meter reading.

The main computer 14 is also connected to a mass storage device 18, which stores all the data pertaining to the customer records. This data can be used for statistical purposes to permit planning of future utility requirements and rate structures.

The described system has considerable advantages over the system currently in use. It gives on a real time basis load management information to utility companies for planning and switching purposes. It obviates the need for human intervention at the customer premises to permit their meters to be read without necessitating the replacement of existing meters. Billing can be fully automated, with the customers accounts being directly debited through the utility company and bank computers.

The embodiments of the invention in which an exclusive property or privilege is claimed are defined as follows:

1. An automatic utility meter reading and monitoring system for monitoring utility usage at a plurality of customer premises comprising:
   (a) at each customer premises,
   a plurality of meters for continuously monitoring consumption of a respective plurality of utility services;
   a sensor associated with each said meter for continuously reading said meter and providing an output representative of the reading thereof;
   a microcomputer having a unique address comprising a memory for storing data representing the readings of said meters, said microcomputer continually monitoring the output of each of the sensors associated with said plurality of meters and updating said memory with the latest readings of said meters, said microcomputer further having means for combining into a single frame a personal identification code assigned to each customer, a security code and data pertaining to the most recent readings of each of said meters; and
   a communications interface for transmitting said single frame to a remote location upon receipt of a polling request; and
   (b) at a central office connected to each customer premises by a remote data communications link:
   a main computer for continually polling each said customer premises at frequency intervals to initiate transmission of a said single frame, said main computer comprising means for separating data pertaining to said plurality of utility services from said single frame, means for storing the transmitted data on each of a plurality of individual customer records, means for scanning through each of the customer records to permit analysis of load distribution, and means for matching the transmitted personal identification code with a code stored in the computer and for activating an alarm in the event a customer is delinquent;
   and means for periodically transmitting said data separately to respective utility company computers to permit billing of each of a plurality of customers at periodic intervals, said frequent intervals being substantially shorter than said periodic intervals;
   whereby said polling of each of said customer premises at frequent intervals permits on-going real time load management information to be obtained in addition to billing information.

2. An automatic utility meter reading and monitoring system as claimed in claim 1 wherein said remote link is a power line over which said data is transmitted.

3. An automatic utility meter reading and monitoring system as claimed in claim 1, wherein said remote link is a telephone line.

4. An automatic utility meter reading and monitoring system as claimed in claim 1, wherein at least one of said sensors comprises an optical reader for reading conventional meters by character recognition.

5. An automatic utility meter reading and monitoring system as claimed in claim 4, wherein said optical reader comprises a camera associated with a means for converting the image formed by said camera to data representing a character indicated by said meters.

6. An automatic utility meter reading and monitoring system as claimed in claim 4, wherein said optical reader comprises a series of matrix character recognition units placed over a dial of each meter.

7. An automatic utility meter reading and monitoring system as claimed in claim 1, wherein at least one of said sensors comprises means for detecting rotation of conventional meters, and said microcomputer determines the amount of service utility service usage from the rotation of said meters.

8. An automatic utility meter reading and monitoring system as claimed in claim 1, wherein said plurality of utility services are electricity, water and gas.

9. An automatic utility meter reading and monitoring system as claimed in claim 1, wherein said main utility company computers are connected directly to bank computers to permit automatic periodic debiting of customer accounts.

10. An automatic utility meter reading and monitoring system as claimed in claim 1, comprising visual display means at said central office giving a continuous indication of load distribution based on the polled readings at said frequent intervals from each of said customer premises.

11. An automatic utility meter reading and monitoring system as claimed in claim 1 wherein said frequent intervals are a few minutes in duration.

12. An automatic utility meter reading and monitoring system as claimed in claim 1 wherein said main computer is connected to a mass storage device for storing integrated data pertaining to each of the customer records over a period of time for statistical purposes to permit planning of future requirements.

* * * * *